US009896612B2

(12) United States Patent
Kefi et al.

(10) Patent No.: US 9,896,612 B2
(45) Date of Patent: Feb. 20, 2018

(54) METHODS FOR CONTROLLING LOST CIRCULATION IN A SUBTERRANEAN WELL AND MATERIALS THERE FOR

(75) Inventors: Slaheddine Kefi, Velizy Villacoublay (FR); Jesse C. Lee, Sugar Land, TX (US); Chrystel Brunet-Cambus, Richebourg (FR); Nikhil Shindgikar, Paris (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 667 days.

(21) Appl. No.: 13/511,144

(22) PCT Filed: Dec. 3, 2010

(86) PCT No.: PCT/EP2010/007482
§ 371 (c)(1),
(2), (4) Date: Sep. 4, 2012

(87) PCT Pub. No.: WO2011/076344
PCT Pub. Date: Jun. 30, 2011

(65) Prior Publication Data
US 2012/0322695 A1 Dec. 20, 2012

(30) Foreign Application Priority Data
Dec. 24, 2009 (EP) .................... 09290997

(51) Int. Cl.
*C09K 8/32* (2006.01)
*C09K 8/502* (2006.01)
*C09K 8/516* (2006.01)
*E21B 21/00* (2006.01)

(52) U.S. Cl.
CPC ............... *C09K 8/32* (2013.01); *C09K 8/502* (2013.01); *C09K 8/516* (2013.01); *E21B 21/003* (2013.01); *C09K 2208/08* (2013.01)

(58) Field of Classification Search
CPC ...... C09K 2208/08; C09K 8/665; C09K 8/70; C09K 8/805; C09K 2208/28; C09K 8/516; C09K 8/92; C09K 8/80; C09K 2208/18; C09K 8/035; C09K 8/502; C09K 2208/04; C09K 2208/30; C09K 8/32; C09K 8/36; Y10S 507/924; Y10S 507/902; Y10S 507/91; Y10S 507/925; E21B 43/12; E21B 34/06; E21B 43/24; E21B 43/26; E21B 7/00; E21B 17/04; E21B 33/12; E21B 43/16; E21B 43/25; E21B 43/267; E21B 17/20; E21B 17/012; E21B 17/028; E21B 17/10; E21B 17/1014; E21B 17/1028; E21B 17/1078; E21B 21/00; E21B 23/002; E21B 29/00; E21B 33/03; E21B 34/08; E21B 37/00; E21B 41/00; E21B 43/013

See application file for complete search history.

(56) References Cited

U.S. PATENT DOCUMENTS

| 2,119,829 | A | 6/1938 | Parsons |
| 2,599,745 | A | 6/1952 | Campbell et al. |
| 3,375,888 | A | 4/1968 | Lummus et al. |
| 3,613,806 | A | 10/1971 | Malott |
| 3,816,235 | A * | 6/1974 | Lin ..................... C03C 25/1015 428/391 |
| 4,422,948 | A | 12/1983 | Corley et al. |
| 6,060,163 | A | 5/2000 | Naaman |
| 2005/0170973 | A1 * | 8/2005 | Verret ..................... C09K 8/502 507/107 |
| 2005/0269085 | A1 | 12/2005 | Cowan |
| 2006/0000611 | A1 * | 1/2006 | Reddy ..................... C04B 28/02 166/293 |
| 2006/0174802 | A1 | 8/2006 | Bedel et al. |
| 2007/0056730 | A1 | 3/2007 | Keese et al. |
| 2009/0321142 | A1 | 12/2009 | Dempsey et al. |

FOREIGN PATENT DOCUMENTS

| EP | 2085447 | * | 8/2009 |
| WO | 2004/101704 | | 11/2004 |
| WO | WO2004/101704 | * | 11/2004 |
| WO | 2006/123143 | | 11/2006 |
| WO | WO2006/123143 | * | 11/2006 |

OTHER PUBLICATIONS http://www.glossary.oilfield.slb.com/en/Terms.aspx?LookIn=term%20name . . . downloaded on Feb. 27, 2015.*
http://www.glossary.oilfield.sib.com/en/Terms.aspx?LookIn=term%20name . . . downloaded on Feb. 27, 2015.*
http://www.glossary.oilfield.sib.com/en/Terms.aspx?LookIn=term%20name . . . , downloaded on Feb. 27, 2015.*
http://www.merriam-webster.com/dictionary/ congregate downloaded on Apr. 29, 2016.*
Daccord G, Craster B, Ladva H, Jones TGJ and Manescu G: "Cement-Formation Interactions," in Nelson E and Guillot D (eds.): Well Cementing—2nd Edition, Houston: Schlumberger (2006): 202-219.
Loewenstein KL: "The Manufacturing Technology of Continuous Glass Fibres," Glass Science and Technology (6) Amsterdam: Elsevier (1993).
Bledzki AK and Gassan J: "Composites Reinforced with Cellulose Based Fibres," Prog. Polym. Sci. 24 (1999) 221-274.
Deiner et al., "Mechanisms of Fatty Acid and Triglyceride Dispersant Bonding in Non-Aqueious Dispersions of NiO", J. Am. Ceram. Soc., vol. 96, No. 3, pp. 750-758, 2013.
Propex, Material Safety Data Sheet, 6 pages, Feb. 28, 2012.

* cited by examiner

*Primary Examiner* — Kumar R Bhushan

(57) ABSTRACT

Method for controlling lost circulation in a subterranean well using oil-dispersible lost-circulation materials which comprise fibers that are coated (or sized) with a lipophilic coupling agent, a lipophilic film-forming polymer or both. The fibers are preferably between about 6 mm and about 25 mm long, and between about 10 μm and about 200 μm in diameter. The fibers may be added to carrier fluids comprising oil-base fluids, synthetic-base fluids, invert-emulsion-base fluids and combinations thereof. The preferred fiber concentration in the carrier fluid is between about 0.55 g/L and about 28.5 g/L. The carrier fluid may be a drilling fluid, a spacer fluid or a lost-circulation pill.

7 Claims, 1 Drawing Sheet

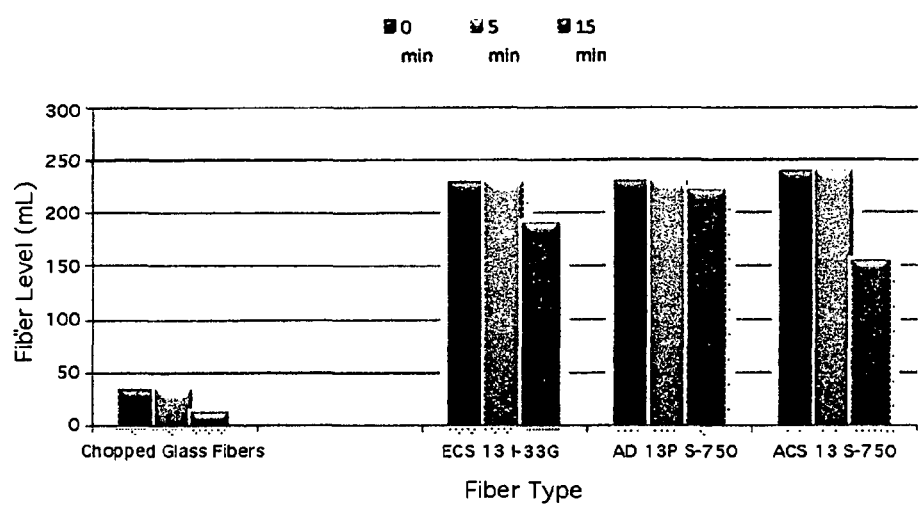

METHODS FOR CONTROLLING LOST CIRCULATION IN A SUBTERRANEAN WELL AND MATERIALS THERE FOR

BACKGROUND OF THE INVENTION

The statements in this section merely provide background information related to the present disclosure and may not constitute prior art.

This invention relates to methods for preventing and/or curing lost circulation in subterranean wells; in particular lost circulation encountered during the drilling of wells such as oil, gas or geothermal wells and the like.

During the construction of a subterranean well, drilling and cementing operations are performed that involve circulating fluids in and out of the well. The fluids exert hydrostatic and pumping pressure against the subterranean rock formations, and may induce a condition known as lost circulation. Lost circulation is the total or partial loss of drilling fluids or cement slurries into highly permeable zones, cavernous formations and fractures or voids. Such openings may be naturally occurring or induced by pressure exerted during pumping operations. Lost circulation should not be confused with fluid loss, which is a filtration process wherein the liquid phase of a drilling fluid or cement slurry escapes into the formation, leaving the solid components behind.

Lost circulation can be an expensive and time-consuming problem. During drilling, this loss may vary from a gradual lowering of the mud level in the pits to a complete loss of returns. Lost circulation may also pose a safety hazard, leading to well-control problems and environmental incidents. During cementing, lost circulation may severely compromise the quality of the cement job, reducing annular coverage, leaving casing exposed to corrosive subterranean fluids, and failing to provide adequate zonal isolation. Lost circulation may also be a problem encountered during well-completion and workover operations, potentially causing formation damage, lost reserves and even loss of the well.

Lost-circulation solutions may be classified into three principal categories: bridging agents, surface-mixed systems and downhole-mixed systems. Bridging agents, also known as lost-circulation materials (LCMs), are solids of various sizes and shapes (e.g., granular, lamellar, fibrous and mixtures thereof). They are generally chosen according to the size of the voids or cracks in the subterranean formation (if known) and, as fluid escapes into the formation, congregate and form a barrier that minimizes or stops further fluid flow. Surface-mixed systems are generally fluids composed of a hydraulic cement slurry or a polymer solution that enters voids in the subterranean formation, sets or thickens, and forms a seal that minimizes or stops further fluid flow. Downhole-mixed systems generally consist of two or more fluids that, upon making contact in the wellbore or the lost-circulation zone, form a viscous plug or a precipitate that seals the zone.

A thorough overview of LCMs, surface-mixed systems and downhole-mixed systems, including guidelines for choosing the appropriate solution for a given situation, is presented in the following reference: Daccord G, Craster B, Ladva H, Jones T G J and Manescu G: "Cement-Formation Interactions," in Nelson E and Guillot D (eds.): *Well Cementing*—$2^{nd}$ Edition, Houston: Schlumberger (2006): 202-219.

Many attempts have been made in the art to solve this problem. Various solutions are known such as adding 1-in.-long sugar-cane fibers (U.S. Pat. No. 2,119,829); combining solids and fibers (U.S. Pat. No. 2,599,745); using a combination of particles, platelets and fibers (U.S. Pat. No. 3,375,888); and the use of a mixture of flexible flakes, fibers and particles as a lost circulation material, especially shredded paper, mineral wool and calcium carbonate that could be degraded in presence of an acid (U.S. Pat. No. 4,422,948). More recently, the influence of fiber shape, and especially fiber cross-section, on cement-matrix reinforcement has been described (U.S. Pat. No. 6,060,163); then, the use of alkaline-resistant fibers in low-density water-based cement slurries with specific granulometry has been discussed (US2006/0174802). Even more recently, US2007/0056730 described the use of 0.5 to 6 pounds per barrel of 10- to 25-mm water-dispersible fibers as an additive in treatment fluids containing an aqueous base in combination with solid particles with an equivalent diameter smaller than 300 µm.

Oil-base, synthetic-base, invert-emulsion-base and water-base muds are available, and operators choose the appropriate mud or muds according to the operating conditions. However, current lost-circulation treatments are limited to water-dispersible LCMs. Despite many valuable contributions in the art, lost-circulation materials (LCMs) that would be dispersible in non-aqueous fluids would be appreciated, improving the efficiency of lost-circulation treatments in a lipophilic environment.

SUMMARY OF THE INVENTION

Means are disclosed for treating a well with fluids comprising LCMs that are dispersible in non-aqueous fluids.

In an aspect, embodiments relate to methods for controlling lost circulation in a subterranean well.

In a further aspect, embodiments relate to lost circulation materials that are dispersible in non-aqueous fluids.

In yet a further aspect, embodiments relate to lost-circulation-treatment fluids comprising oil-dispersible fibers and carrier fluids comprising an oil-base fluid, a synthetic-base fluid, an invert-emulsion-base fluid and mixtures thereof.

BRIEF DESCRIPTION OF THE DRAWINGS

FIG. 1 is a graph showing the dispersibility of fibers according to the present invention, compared with that of commercially available fibers from the art (0 minutes corresponds to the left rectangle, 5 minutes is the rectangle in the middle, and 15 minutes is the right rectangle).

DETAILED DESCRIPTION

At the outset, it should be noted that in the development of any such actual embodiment, numerous implementations—specific decisions must be made to achieve the developer's specific goals, such as compliance with system-related and business-related constraints, which will vary from one implementation to another. Moreover, it will be appreciated that such a development effort might be complex and time consuming, but would nevertheless be a routine undertaking for those of ordinary skill in the art having the benefit of this disclosure. In addition, the composition used/disclosed herein may also comprise some components other than those cited. In the summary of the invention and this detailed description, each numerical value should be read once as modified by the term "about" (unless already expressly so modified), and then read again as not so modified unless otherwise indicated in context. Also, in the summary of the invention and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific points, it is to be understood that the inventors appreciate and understand that any and all data points within the range are to be considered to have been specified, and that the inventors possessed knowledge of the entire range and all points within the range.

Fiber manufacturers typically apply coatings, or "sizings," on fiber surfaces for various purposes. Accordingly, the sizing typically comprises a coupling agent or a polymer film former, or both, and optionally various additives such as lubricants, antistatic agents, emulsifiers, wetting agents, antioxidants and other specialized proprietary materials. The polymer film former is useful for keeping fibers as bundles during storage and before addition and should be designed to easily dissolve fluids to which the fibers are added. Sizing is a method known to the skilled artisan. Such technology is described in the following publications. Loewenstein K L: "The Manufacturing Technology of Continuous Glass Fibres," *Glass Science and Technology* (6) Amsterdam: Elsevier (1993). Bledzki A K and Gassan J: "Composites Reinforced with Cellulose Based Fibres," *Prog. Polym. Sci.* 24 (1999) 221-274.

The inventors have surprisingly discovered that fibers sized with lipophilic coupling agents or lipophilic film-forming polymers demonstrate improved compatibility with and dispersibility in non-aqueous fluids. The non-aqueous fluids may comprise oil-base fluids, synthetic-base fluids, invert-emulsion-base fluids and combinations thereof.

Suitable lipophilic coupling agents comprise (but are not limited to) one or more nonpolymeric compounds with alkyl groups, aromatic groups, acetic anhydride, n-alkyl isocyanate, titanates, trichloro-s-triazine, and organosilanes of the structure R—S—$X_3$, wherein R is an organic group and X comprises Cl, OMe or OEt. OMe denotes a methylene-oxide group, and OEt denotes an ethylene-oxide group. Preferably, the organosilane is either a chloro- or alkoxy-silane that chemically bonds to the glass surface and promotes efficient fiber dispersion in the carrier fluid.

Suitable lipophilic film-forming polymers comprise (but are not limited to) polyurethanes, polystyrenes, polyvinyl chlorides, polyolefins, polyesters, epoxy resins, modified epoxy resins, and copolymers thereof.

In an aspect, embodiments relate to methods for controlling lost circulation in a subterranean well. One or more fibers that are sized with a lipophilic coupling agent are selected. The fibers are mixed with a carrier fluid that comprises an oil-base fluid, a synthetic-base fluid, an invert-emulsion-base fluid or combinations thereof. The fibers may be mixed with carrier fluid in the surface equipment employed to prepare drilling fluid. The resulting fluid containing fibers is pumped into the subterranean lost-circulation zone. The fluid may be (but would not be limited to) a drilling fluid, a spacer fluid, or a lost-circulation pill of limited volume. Lost-circulation pills may not return to the surface, thereby avoiding plugging surface equipment.

In a further aspect, embodiments relate to a lost-circulation material (LCM). The material comprises fibers that are sized with a lipophilic coupling agent.

In yet a further aspect, embodiments relate to a lost-circulation-treatment fluid. The base fluid is an oil-base fluid, a synthetic-base fluid, an invert-emulsion-base fluid or a combination thereof. The fluid further comprises fibers sized with a lipophilic coupling agent. The fluid may be (but would not be limited to) a drilling fluid, a spacer fluid, or a lost-circulation pill of limited volume. Lost-circulation pills may not return to the surface, thereby avoiding plugging surface equipment.

For all embodiments, suitable fibers may be chosen from (but are not limited to):

(1) Vegetable fibers, such as abaca, banana fibers, agel (gebang), aramnia (malva, carapicho, cadillo, urena lobata), arenga, bagasse, cattail (reed), chia, coir, cotton, cottongrass, esparto, flax, hemp, jute, kapok, kenaf, kudzu, milkweed, nettle, okra, papaya, paper mulberry, pina, pine, raffia, ramie, rattan, rice, roselle hemp, sisal, umbrella plant, wheat and wisteria;

(2) Fibers derived from an animal source, such as alpaca, angora, beaver, cat, camel hair, cashmere, catgut, finner, fox, horse hair, human hair, lama hair, mink, mohair, pashmina, possum hair, quiviut, rabbit, silk, sinew, spider silk, vicuna, wool and yak hair;

(3) Natural mineral fibers such as asbestos, attapulgite, basalt, glass wool, halloysite, mineral wool, rock wool, slag wool, quartz and wollastonite;

(4) Synthetic mineral fibers such as: aluminium, aluminosilicate, boron, carbon graphite, copper, glass, alkali-resistant glass, gold, iron, nickel, silica, silicon carbide, silver, stainless steel, steel and zirconium oxide;

(5) Cellulosic fibers such as balsa, bamboo, cellulose acetate, cellulose diacetate, cellulose triacetate, cupro, lyocell, modal, nitrocellulose, polynosic, rayon (viscose fibers) and wood;

(6) Protein fibers such as milk fibers, peanut, soybean and zein;

(7) Natural materials such as alginate and natural rubber;

(8) Synthetic polymers such as phenol-formaldehyde resin, polyacetal, polyacrylate, polyacrylonitrile and particularly acrylic and oxidized acrylics, polyamide (nylon, tactel), aromatic polyamides (aramid), polybenzimidazole, polycarbonate, polychlal (copolymer of polyvinylchloride and polyvinylalcohol), polycaprolactone, polydioxanone, polyester, polyethylenenaphtalate, polyethyleneterephtalate, polyether ether ketone, polyethylene, polyethylenimine, polyglycolide, polyhydroxyalcanoate, polyimide, polylactic acid, cross-linked polymelamine, polyoxyazole, polyphenylenesulfide, polypropylene, polystyrene, polysulfone, fluoropolymers, polyvinyl alcohol, polyvinylchloride, polyvinylidenechloride and polyvinylidenenitrile; and (9) Elastomers such as: polybutadiene, polychloroprene, polyisoprene, polyolefin; and/or microfibers; and/or copolymers such as copolymer of polyacrylonitirile and polyvinylchloride, acrylic (polyacrylonitril, copolymer of polyacrylonitrile and either polymethyl methacrylate or polyvinyl acetate or polyvinyl pyridine), modacrylic (copolymer of polyacrylonitrile and either polyvinyl chloride or polyvinylidene chloride or polyvinyl pyrrolidone or polymethylacrylate), polyurethane-polyurea copolymer, acrylonitrile-butadiene copolymer and poly(lactic-co-glycolic) acid.

Of these, fibers comprising polypropylene, polyamide, glass, alkali-resistant glass, and mixtures thereof are preferred. Alkali-resistant glass fibers are particularly preferred.

For all embodiments, the fibers preferably have a length between about 6 and about 25 mm, more preferably between 6 and 17 mm, and even more preferably between about 10 mm and 17 mm. In the case of alkali-resistant glass, the preferred fiber length is between about 10 mm and about 15 mm. The fibers are preferably added at a concentration between about 0.2 and about 10 pounds per barrel of fluid (0.55 and 28.5 g/L of fluid). The fibers preferably have a diameter between about 10 μm and about 200 μm. The fibers may be of a variety of shapes ranging from simple round or ovals to fibers having complex trilobed, figure eight, star shaped, or rectangular cross-sections. Curved, crimped, spiral shaped and other three-dimensional fiber geometries may be used as well. When the fibers are manufactured as stapled fibers, the polymer film former may not be present. Conversely, especially for small-sized fibers with diameters typically between 10 μm and 60 μm, the fibers shall preferably be agglomerated as bundles or "tows," using a film-forming material.

For all embodiments, the plugging efficiency may be further improved by including granular or flaked particles in the fluid before pumping. The particles may also comprise weighting materials such as (but not limited to) barite (barium sulfate), calcium carbonate, hematite (iron oxide), ilmenite (iron titanium oxide), siderite (iron carbonate), galena (lead sulfide), manganese tetraoxide, titanium oxide and zinc oxide. The weighting particles preferably have an average particle size in the range of 0.5 μm to 200 μm, preferably 20 μm to 100 μm—about 100 to 1000 times smaller than the dispersible fibers. The concentration of weighting material is preferably between 0.2 kg/L and 2 kg/L of fluid, and more preferably between 0.25 kg/L and 1.5 kg/L of fluid. For all embodiments, the oil-dispersible fibers sized with lipophilic coupling agents, lipophilic film-forming polymers or both may be mixed with water-dispersible fibers sized with hydrophilic coupling agents, hydrophilic film-forming polymers or both. Such mixtures may be useful for situations during which oil-base, synthetic-base or invert-emulsion-base fluids are used for drilling, but water from the formation is invading the borehole. Such mixtures may also be useful as an all-purpose LCM for either oil-base, synthetic-base, invert-emulsion-base, or water-based fluids. The preferred weight ratio between oil-dispersible fibers and water-dispersible fibers is from 1:99 to 99:1, more preferably between 30:70 and 70:30.

Suitable hydrophilic coupling agents for the water-dispersible fibers include (but are not limited to) amines, amide esters, carboxylic acids and precursors (anhydride, isocyanates, acyl chloride), chlorinated groups, brominated groups, positively or negatively charged groups. Suitable hydrophilic film-forming polymers include (but are not limited to) polyvinylalcohols, polyvinyl acetates, polyamines, carbohydrates, polyelectrolytes, polyacrylamides and derivatives, polyacrylics and derivatives and copolymers thereof.

EXAMPLES

The following examples serve to further illustrate the invention.

Example 1

Dispersibility in Oil

Four fiber mixtures were prepared. Their compositions are given in Table 1.

TABLE 1

Compositions of Fiber Mixtures for Dispersibility Experiments.

| Fiber | Additive | Fluid | Volume (mL) |
| --- | --- | --- | --- |
| 1.71 g [2.4 lbm/bbl] of alkali-resistant chopped glass fibers - 10- to 14-mm long | — | Oil | 60 ± 10 |
| 1.71 g [2.4 lbm/bbl] of ECS 13 I-33G | | Oil | 194 ± 10 |
| 1.71 g [2.4 lbm/bbl] of AD 13P S-750 | | Oil | 195 ± 10 |
| 1.71 g [2.4 lbm/bbl] of ACS 13 S-750 | | Oil | 250 ± 10 |

Fiber Volume in 400 mL glass cylinder
(Oil is Exxsol™ D100 supplied by ExxonMobil Chemical).

The following fibers were used: alkali-resistant (AR) chopped glass fibers (available from Owens Corning Vetrotek alias Saint-Gobain Vetrotek, 10- to 14-mm long, no specific sizing treatment), ECS 13I-33G (glass fibers, 13-mm long, diameter of 10.3 μm, oil compatible sizing), ACS 13 S-750 (AR glass fibers, 13-mm long, diameter of 13.5 μm, oil-compatible sizing) and AD 13P S-750 (AR glass fibers, 13-mm long, diameter of 18 μm, oil compatible sizing). ECS 13I-33G, ACS13 S-750 and AD 13P S-750 are available from Nippon Electric Glass Co., Ltd.

1.71 g of fibers was added to 250 mL of mineral oil (Exxsol D100) in a 400-mL glass beaker having a diameter of 6.6 cm. A spatula was used to stir the fibers into the fluid. After one minute of stirring, the spatula was removed and the beaker was closed with a bung. Then, the fluid was further mixed by shaking. After five shakes, the highest point where fibers were found was recorded. A glass cylinder was used to avoid fibers physically adhering to cylinder walls, a problem often observed with a plastic cylinder.

The oil density was lower than the density of all fibers tested. To prevent any variation due to density differences, sufficient time was allowed for the fibers to settle before a reading was taken in the beaker. Experiments were performed in duplicate to estimate repeatability and standard deviation. When switching to synthetic oil or diesel, no significant difference was observed.

Dispersibility measurements are shown in FIG. 1. A fiber volume of 12 mL was used as a benchmark for determining the efficiency of AR chopped glass fibers dispersion in oil after 15 minutes of settling. As apparent, ECS13 I-33G, ACS13 S-750 and AD 13P S-750 were dispersible in oil.

Example 2

Plug Performance in Oil-Base Fluid

The mud formulation of Table 2 was prepared.

TABLE 2

| Mud Formulation | |
|---|---|
| VERSACLEAN 80/20 | Concentrations and Properties |
| Base Oil (Exxsol D100) | 558 g/L [195 lbm/bbl] (0.7 L/L [0.7 bbl/bbl]) |
| Emulsifier (Versamul ®) | 12 g/L [4.2 lbm/bbl] |
| Surfactant (Versacoat ®) | 12.6 g/L [4.4 lbm/bbl] |
| Calcium Hydroxide (Lime) | 22.4 g/L [7.85 lbm/bbl] |
| Gelling Agent (Organophilic Clay) | 14.3 g/L [5 lbm/bbl] of Bentone ™ 38 |
| Filtration Control Agent (Ecotrol ®) | 14.3 g/L [5 lbm/bbl] |
| Water | 184 g/L [65 lbm/bbl] (0.18 L/L [0.18 bbl/bbl]) |
| Calcium Chloride | 53.5 g/L [18.8 lbm/bbl] |
| Weighting Agent (API Barite) | 776 g/L [272 lbm/bbl] |
| Mud Density | 1.53 SG [12.8 lbm/gal] |
| Solid Loading | 18% |
| Rheology AHR* (50° C. [122° F.]) | |
| Plastic Viscosity | 40 cP |
| Yield Point | 20 lbf/100 ft$^2$ |
| API HPHT Fluid Loss | 0.5 mL after 30 min |

*AHR: After Hot-Rolling
Versamul*, Versacoat* and Ecotrol* are available from MI SWACO.
Bentone ™ is available from Elementis Specialties.

After the addition of 4 lbm/bbl (11.42 g/L) of glass fibers ACS 13S 750 and 28 lbm/bbl (79.94 g/L) of Gilsonite™, available from American Gilsonite Co., the fluid plugged a grid of 1-mm holes under 10-bar pressure at 25° C. with 20 mL of spurt loss.

Example 3

Plug Performance in Oil-Based Fluid

The mud formulation of Table 3 was prepared.

TABLE 3

| Mud Formulation | |
|---|---|
| VERSACLEAN 80/20 | Concentrations and Properties |
| Base Oil (Exxsol D100) | 405.9 g/L [142.25 lbm/bbl] |
| Emulsifier (Versamul ®) | 12.6 g/L [4.4 lbm/bbl] |
| Surfactant (Versacoat ®) | 12.6 g/L [4.4 lbm/bbl] |
| Calcium Hydroxide (Lime) | 22.9 g/L [8 lbm/bbl] |
| Gelling Agent (Organophilic Clay) | 8.6 g/L [3 lbm/bbl] of Bentone ™ 38 |
| Filtration Control Agent (Ecotrol ®) | 14.3 g/L [5 lbm/bbl] |
| Water | 137.1 g/L [48 lbm/bbl] |
| Calcium Chloride | 39.6 g/L [13.9 lbm/bbl] |
| Weighting Agent (Calcium Carbonate) | 800 g/L [280 lbm/bbl] |
| Mud Density | 1.45 SG [12.1 lb/gal] |
| Solid Loading | 29% |

Versamul*, Versacoat* and Ecotrol* are available from MI SWACO.
Bentone ™ is available from Elementis Specialties.

After the addition of a blend of two oil-dispersible fibers—2.5 lbm/bbl (7.14 g/L) of glass fibers ACS 13S 750 and 0.85 lbm/bbl (2.43 g/L) polypropylene fibers (Fiber- mesh® 150 available from Propex, Ltd.) (12-mm long, diameter of 50 μm)—the fluid plugged a grid of 2-mm slots under 10-bar pressure at 25° C. with 0 mL of spurt loss.

Example 4

Plug Performance in Oil-Based Fluid

The mud formulation of Table 4 was prepared.

| VERSACLEAN 80/20 | Concentrations and Properties |
|---|---|
| Base Oil (Exxsol D100) | 463 g/L [162.3 lbm/bbl] |
| Emulsifier (Versamul ®) | 10 g/L [3.5 lbm/bbl] |
| Surfactant (Versacoat ®) | 10 g/L [3.5 lbm/bbl] |
| Calcium Hydroxide (Lime) | 20 g/L [7 lbm/bbl] |
| Gelling Agent (Organophilic Clay) | 11.4 g/L [4 lbm/bbl] of VG-Supreme ® |
| Filtration Control Agent (Ecotrol ®) | 8.6 g/L [3 lbm/bbl] |
| Water | 252.75 g/L [88.6 lbm/bbl] |
| Calcium Chloride | 89 g/L [31.2 lbm/bbl] |
| Weighting Agent (API Barite) | 453.5 g/L [159 lbm/bbl] |
| Mud Density | 1.32 SG [11 lb/gal] |
| Solid Loading | 11.2% |

Versamul*, Versacoat*, VG-Supreme and Ecotrol* are available from MI SWACO.

After the addition of 4.4 lbm/bbl (12.56 g/L) of oil-dispersible polyamide fibers PA 6-6 (available from Rhodia, 13-mm long, diameter of 42.5 μm) and 117 lbm/bbl (334.02 g/L) of calcium carbonate, the fluid plugged a grid of 3-mm slots under 10-bar pressure at 25° C. with 0 mL of spurt loss.

The invention claimed is:

1. A method for controlling lost circulation in a subterranean well, comprising:
   (i) selecting fibers consisting of alkali-resistant glass fibers that are sized with a nonpolymeric lipophilic coupling agent;
   (ii) mixing only the selected fibers with a carrier fluid to form a dispersion of fibers, wherein the carrier fluid comprises one or more members selected from the group consisting of an oil-base fluid, a synthetic-base fluid and an invert-emulsion-base fluid; and
   (iii) pumping the dispersion of fibers into the lost-circulation zone, wherein the selected fibers congregate to prevent lost circulation in the lost-circulation zone as the carrier fluid escapes into the lost-circulation zone;
   wherein, the carrier fluid is a member selected from the group consisting of a drilling fluid, a spacer fluid and a lost-circulation pill.

2. The method of claim 1, wherein the fiber length is between 6 mm and 25 mm.

3. The method of claim 1, wherein the fiber diameter is between 10 μm and 200 μm.

4. The method of claim 1, wherein the fibers are added to the carrier fluid at a concentration between 0.55 g/L and 28.5 g/L of fluid.

5. The method of claim 1, wherein the lipophilic coupling agent comprises one or more members selected from the group consisting of alkyl groups, aromatic groups, acetic anhydride, n-alkyl isocyanate, titanates, trichloro-s-triazine, and organosilanes of the structure R—Si $X_3$, wherein R is an organic group and X comprises Cl.

6. The method of claim 1, further comprising the addition of one or more water-dispersible fibers that are sized with a hydrophilic coupling agent, a hydrophilic film-forming polymer or both.

7. The method of claim 1, wherein granular or flaked particles are added to the fibers.

\* \* \* \* \*